United States Patent
Kodali et al.

(10) Patent No.: US 11,445,481 B2
(45) Date of Patent: Sep. 13, 2022

(54) EARLY PACKET DELIVERY TO RADIO LINK CONTROL

(71) Applicant: Apple Inc., Cupertino, CA (US)

(72) Inventors: Sree Ram Kodali, Sunnyvale, CA (US); Srirang A. Lovlekar, Cupertino, CA (US); Haijing Hu, Beijing (CN); Yuqin Chen, Shenzhen (CN); Xu Ou, San Jose, CA (US); Fangli Xu, Beijing (CN); Dawei Zhang, Saratoga, CA (US); Longda Xing, San Jose, CA (US); Murtaza A. Shikari, Mountain View, CA (US); Sethuraman Gurumoorthy, San Jose, CA (US); Srinivasan Nimmala, San Jose, CA (US)

(73) Assignee: Apple Inc., Cupertino, CA (US)

( * ) Notice: Subject to any disclaimer, the term of this patent is extended or adjusted under 35 U.S.C. 154(b) by 35 days.

(21) Appl. No.: 17/051,641

(22) PCT Filed: Jun. 1, 2018

(86) PCT No.: PCT/CN2018/089582
§ 371 (c)(1),
(2) Date: Oct. 29, 2020

(87) PCT Pub. No.: WO2019/227475
PCT Pub. Date: Dec. 5, 2019

(65) Prior Publication Data
US 2021/0068082 A1    Mar. 4, 2021

(51) Int. Cl.
*H04W 72/04* (2009.01)
*H04L 1/00* (2006.01)
*H04L 45/74* (2022.01)

(52) U.S. Cl.
CPC .......... *H04W 72/04* (2013.01); *H04L 1/0061* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 2009/0313516 A1* | 12/2009 | Shin | H04L 1/0009 714/748 |
| 2013/0208600 A1* | 8/2013 | Campbell | H04L 1/0061 370/241 |

(Continued)

FOREIGN PATENT DOCUMENTS

| | | |
|---|---|---|
| CN | 105634504 A | 6/2016 |
| WO | 2009122307 A2 | 10/2009 |

(Continued)

OTHER PUBLICATIONS

International Search Report and Written Opinion for Application No. PCT/CN2018/089582, dated Feb. 27, 2019; 9 pages.

*Primary Examiner* — Lonnie V Sweet
(74) *Attorney, Agent, or Firm* — Kowert, Hood, Munyon, Rankin & Goetzel, P.C.

(57) ABSTRACT

This disclosure relates to providing early packet delivery to radio link control. A transport block may be received by a wireless device via wireless communication. The transport block may fail a transport block cyclic redundancy check, but a subset of the code blocks of the transport block may pass code block cyclic redundancy checks. Packet data from the subset of the code blocks that pass code block cyclic redundancy checks may be provided to a radio link control layer of the wireless device, based at least in part on the successful code block cyclic redundancy checks for those code blocks.

20 Claims, 11 Drawing Sheets

(56) References Cited

U.S. PATENT DOCUMENTS

| | | | |
|---|---|---|---|
| 2014/0189447 A1* | 7/2014 | Liang | H04L 1/0061 |
| | | | 714/712 |
| 2014/0281943 A1 | 9/2014 | Prilepov et al. | |
| 2016/0233999 A1* | 8/2016 | Chendamarai Kannan | |
| | | | H04W 72/0406 |
| 2016/0261382 A1* | 9/2016 | Vajapeyam | H04L 1/1893 |
| 2017/0366311 A1* | 12/2017 | Iyer | H04B 7/0482 |
| 2019/0182809 A1* | 6/2019 | Liu | H04W 80/02 |

FOREIGN PATENT DOCUMENTS

| | | | | |
|---|---|---|---|---|
| WO | 2017161583 A1 | 9/2017 | | |
| WO | WO-2018033069 A1 * | 2/2018 | | H04L 1/0041 |

* cited by examiner

EARLY PACKET DELIVERY TO RADIO LINK CONTROL

PRIORITY CLAIM

This application is a national phase entry of PCT application number PCT/CN2018/089582, entitled "Early Packet Delivery to Radio Link Control," filed Jun. 1, 2018, which is hereby incorporated by reference in its entirety as though fully and completely set forth herein.

FIELD

The present application relates to wireless communications, and more particularly to systems, apparatuses, and methods for providing early packet delivery to radio link control.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments are presented herein of apparatuses, systems, and methods for providing early packet delivery to radio link control.

According to the techniques described herein, a wireless device may make use of multiple levels of cyclic redundancy checks to be able to provide packet data to its radio link control layer even when a cyclic redundancy check for the transport block containing the packet data fails. For example, the transport block may be segmented into multiple code blocks, each of which may be cyclic redundancy check protected at the code block level. Thus, as long as one or more code blocks pass their cyclic redundancy checks, there may be packet data that can be provided to radio link control, even if the transport block as a whole does not pass its cyclic redundancy check. Such techniques may reduce the delay in providing packets to the radio link control layer from the media access control layer of the wireless device.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
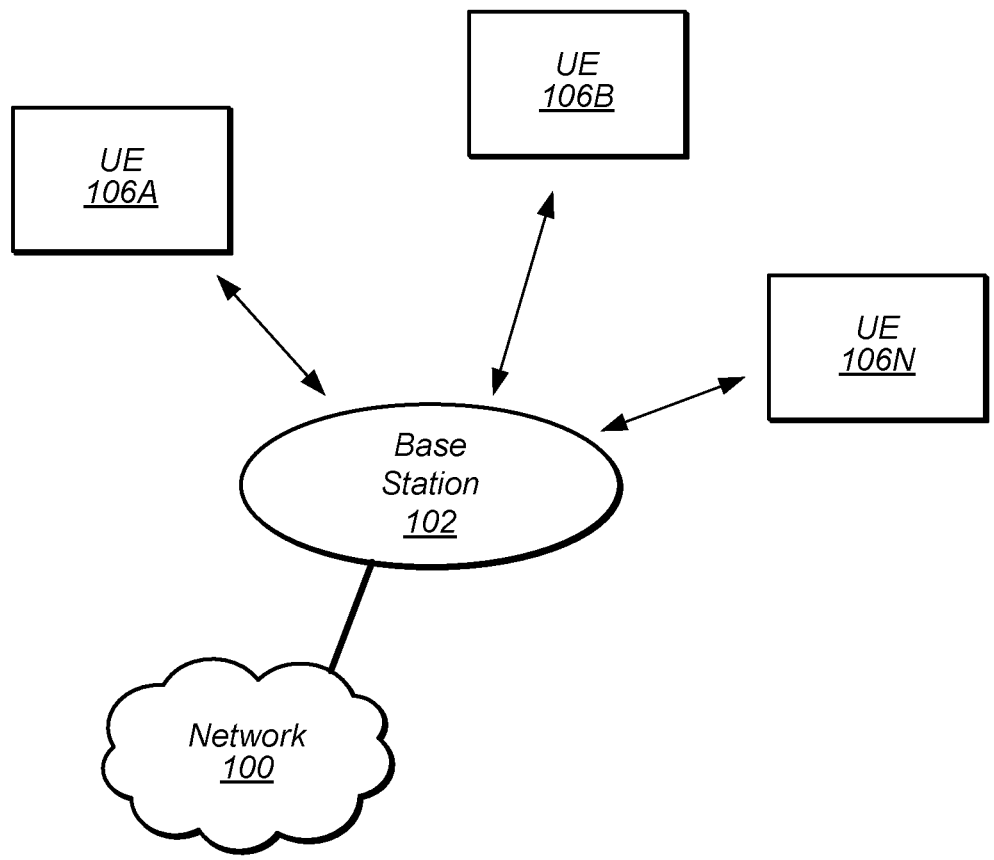
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit RX: Reception/Receive
RAT: Radio Access Technology Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.: a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
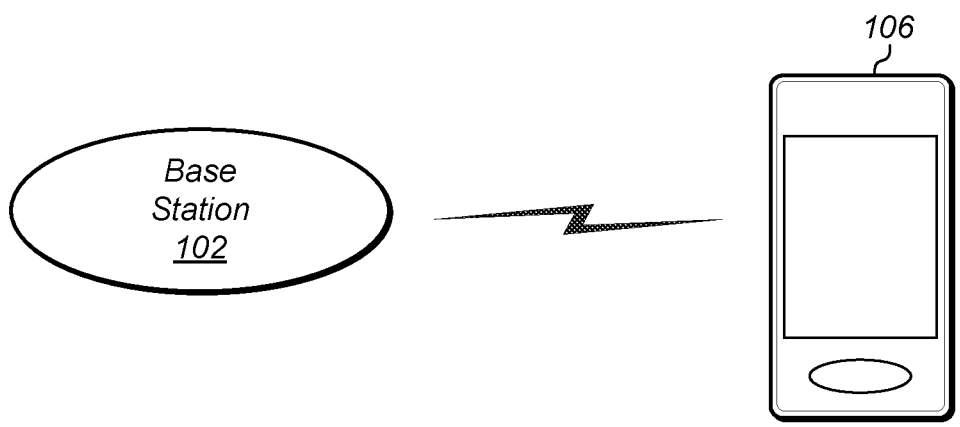
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform cellular communication using techniques for early packet delivery to radio link control, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a handheld device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
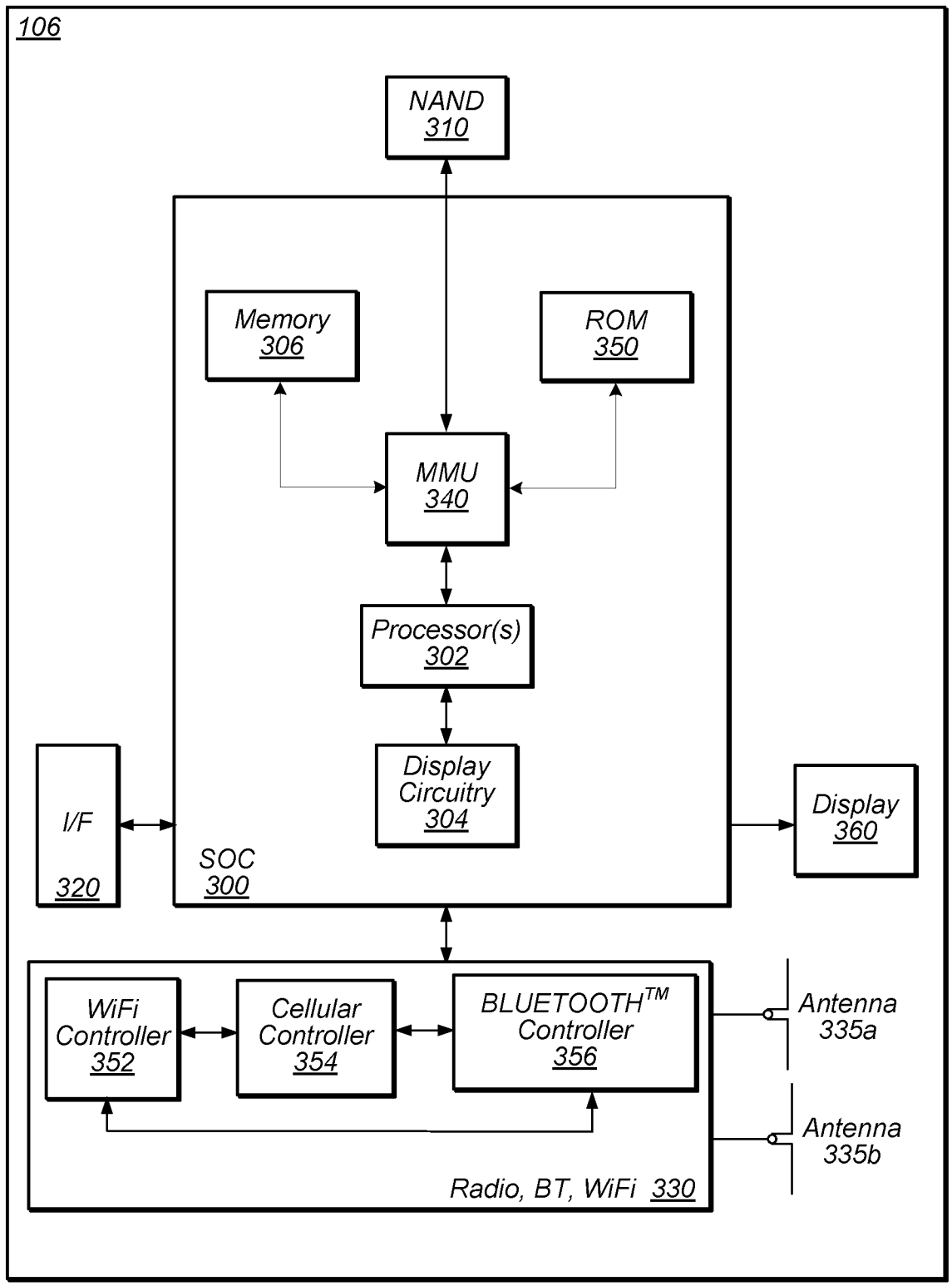
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to provide early packet delivery to radio link control, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to provide early packet delivery to radio link control according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., NR, LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
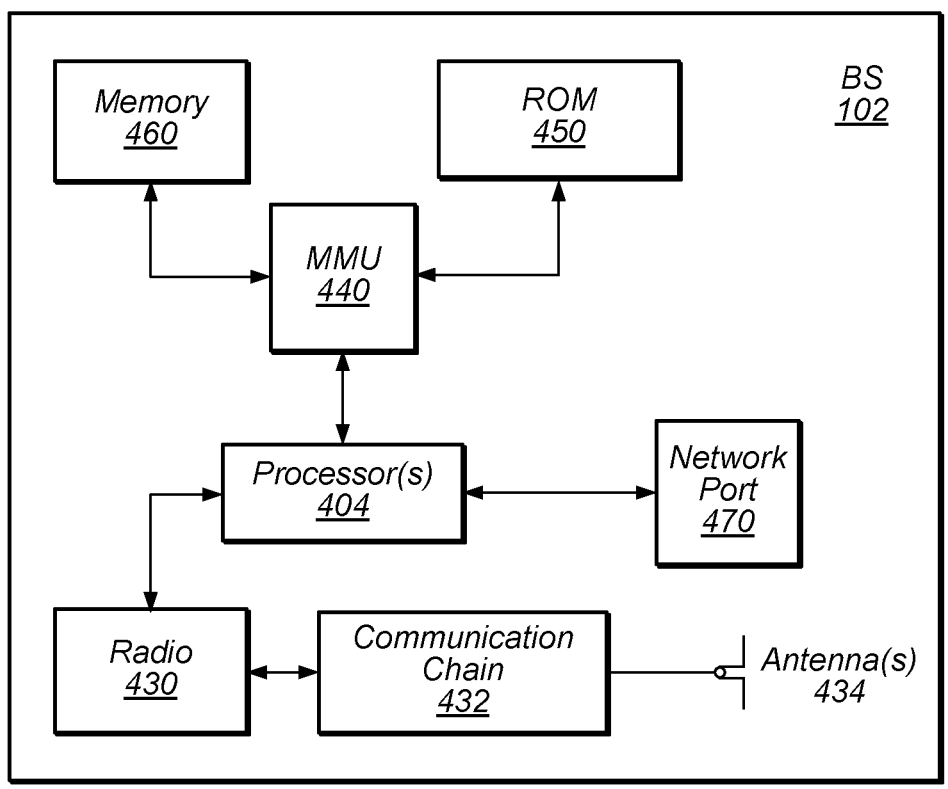
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for providing and/or supporting provision of early packet delivery to radio link control.

Figure 5:
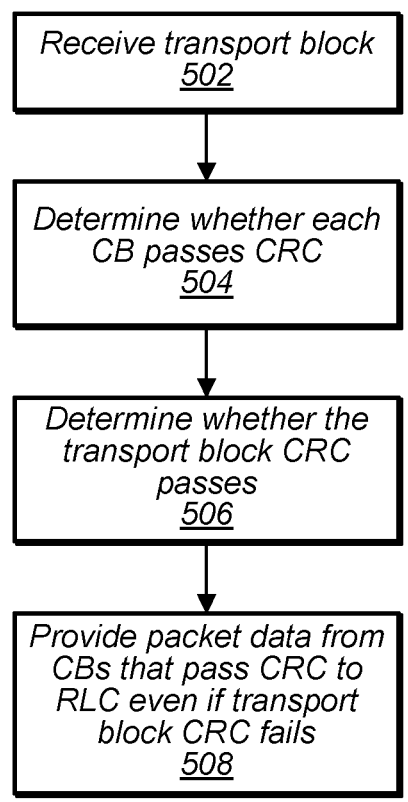
FIG. 5 is a flowchart diagram illustrating aspects of an exemplary possible method for providing early packet delivery to radio link control, according to some embodiments.

FIG. 5—Early Packet Delivery to Radio Link Control

FIG. 5 is a flowchart diagram illustrating a method for a wireless device to provide early packet delivery to radio link control when performing cellular communication, according to some embodiments.

Aspects of the method of FIG. 5 may be implemented by a wireless device, such as a UE 106 or a BS 102 illustrated in and described with respect to various of the Figures herein, or more generally in conjunction with any of the computer systems or devices shown in the above Figures, among other devices, as desired. Note that while at least some elements of the method of FIG. 5 are described in a manner relating to the use of communication techniques and/or features associated with LTE, LTE-A, NR, and/or 3GPP specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, a wireless device may receive a transport block via wireless communication. According to some embodiments, the transport block may be received from a cellular base station serving the wireless device. As another possibility, the wireless device may be a cellular base station, and the transport block may be received from a device served by the cellular base station. The wireless communication may comply with 3GPP 5G NR specifications, in some embodiments. Alternatively, any of various other wireless communication technologies may be used to perform the wireless communication, as desired.

The transport block may include any of various logical portions. For example, the transport block may include multiple code blocks, each of which may be cyclic redundancy check (CRC) protected. The transport block as a whole may also be CRC protected, at least according to some embodiments.

The transport block may be processed in any of various ways. According to some embodiments, physical (PHY) layer processing to demodulate, perform rate matching, and channel decoding may be used to obtain the media access control (MAC) layer transport block.

As the transport block may have multiple layers of CRC protection, CRC tests may performed (e.g., by a MAC layer of the wireless device) at both the code block and transport block levels. Thus, in 504, the wireless device may determine whether each code block passes or fails a code block cyclic redundancy check (e.g., by calculating a CRC value for the code block, and comparing it to the value of a CRC field appended to the code block). In some instances, all code blocks may pass their code block CRCs, and in other instances, all code blocks may fail their code block CRCs. As a still further possibility, in some instances, the wireless device may determine that a subset of the code blocks of the transport block passed their code block CRCs, and that a subset of the code blocks of the transport block failed their code block CRCs.

In 506, the wireless device may determine whether the (e.g., overall) transport block passes or fails a transport block cyclic redundancy check (e.g., by calculating a CRC value for the transport block, and comparing it to the value of a CRC field appended to the transport block). In some instances, the transport block may pass the transport block CRC, and in other instances, the transport block may fail the transport block CRC.

Thus, there may be at least some instances when the transport block CRC fails, but at least a subset of the code block CRCs pass. In such instances, it may be the case that the wireless device provides packet data from the subset of the code blocks that passed code block CRCs to a radio link control (RLC) layer of the wireless device (508). Such early provision of packet data to the RLC layer may reduce data processing delays, and at least in some instances, may further reduce overall network communication delays and/or improve network communication throughput, e.g., by reducing the likelihood that additional higher layer delays or data rate reductions (e.g., TCP throttling, among various possibilities) may be enforced as a result of the lower layer delays.

At least in some instances, packet data may be provided to RLC in increments of complete RLC protocol data units (PDUs). Thus, at least in some embodiments, the wireless device may determine whether the subset of code blocks that passed code block CRCs include at least one complete RLC PDU. If so, any complete RLC PDUs included in the subset of code blocks that passed code block CRCs may be provided to RLC. However, any partial/incomplete RLC PDUs (e.g., which may occur if a portion of the RLC PDU is included in a code block that did not pass its code block CRC) may be dropped.

Such determination of whether the subset of code blocks that passed code block CRCs include at least one complete RLC PDU may be based at least in part on MAC headers for the transport block. For example, the wireless device may parse at least a portion of the MAC headers of the transport block e.g., those headers included in code blocks that passed code block CRCs), and may thus be able to determine RLC PDU length for a RLC PDU in the transport block from a length MAC header field for the RLC PDU. The wireless device may determine from the length (and possibly relative position) of those code blocks that passed code block CRCs, as well as from the length(s) of the RLC PDU(s) in the transport block how many (if any) complete RLC PDUs are included in those code blocks that passed code block CRCs.

Note that hybrid automatic repeat request (HARQ) feedback may be provided to the transmitter of the transport block in conjunction with such a scheme for early packet delivery to RLC, e.g., as part of MAC layer functionality. For example, HARQ feedback may be provided for each of one or more code block groups (e.g., each of which may include one or more code blocks), as well as for the overall transport block. Thus, the transmitter may provide a retransmission of the entire transport block (e.g., since the transport block CRC failed), or at least retransmissions of those code blocks that failed code block CRCs).

At least according to some embodiments, an indication that the packet data (e.g., the one or more complete RLC PDUs) from the code blocks that passed code block CRCs are associated with a transport block that failed a transport block level cyclic redundancy check may be provided to the RLC layer. If desired, such an indication can be used to reduce the (e.g., already very small) likelihood that corrupted packet data is processed. For example, the wireless device might subsequently receive another (e.g., retransmission) transport block that passes the transport block CRC. The packet data from the retransmission transport block may be provided to the RLC layer. In such a case, if the packet data from the retransmission transport block includes one or more RLC PDUs that are duplicates of RLC PDUs that are still in RLC buffers (e.g., awaiting RLC processing) and that are associated with a transport block that failed a transport block level CRC, the RLC layer may discard the duplicate packet data that is associated with a transport block that failed a transport block level CRC. Note that if the RLC layer has already consumed/processed a RLC PDU that is associated with a transport block that failed a transport block level CRC and subsequently receives a duplicate RLC PDU that is associated with a transport block that passed a transport block level CRC, the duplicate RLC PDU that is associated with the transport block that passed the transport block level CRC may be discarded, e.g., since the previously received version may already have been processed. Alternatively, the wireless device may not implement any such special handling for later-received duplicate RLC PDUs associated with transport blocks that pass transport block level CRCs, e.g., to avoid introducing additional device complexity.

Note that if desired, a mechanism may be provided for a cellular network to control whether such early packet delivery to RLC is enabled or disabled. For example, a cellular base station serving the wireless device may provide control signaling to indicate of whether providing packet data from code blocks that pass code block cyclic redundancy checks within a transport block that fails a transport block cyclic redundancy check to radio link control is allowed. Such control signaling may be included in broadcast system information for a cell, or may be provided on a device-by-device basis (e.g., with the potential for a wireless device to be configured differently at different times and/or for different radio bearers), for example using radio resource control signaling, among various possibilities.

In many instances, a transport block that fails the transport block level CRC but that includes one or more code blocks that pass the code block level CRCs may include one or more MAC control elements (CEs). Such MAC CEs may be handled in any of various ways. As one possibility, the wireless device may determine not to act on any MAC CEs from a transport block that fails a transport block CRC. Since HARQ retransmission techniques may be used for reliability, the wireless device may be able to act on those MAC CEs provided by the transmitter in a subsequent transport block that passes its transport block CRC. As another possibility, the wireless device may determine to parse and act on one or more (e.g., either or both of variable and fixed length) MAC CEs from a transport block that fails its transport block CRC, e.g., as long as it can decode a complete MAC CE (e.g., including R, LCID, and potentially optional L and CE contents). In such a case, if a retransmission that includes the same MAC CEs is subsequently received, the wireless device may determine to ignore/not act on the retransmitted MAC CE(s) on which it has already acted.

FIGS. 6-12—Additional Information

FIGS. 6-12 and the following information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

Many communication systems may utilize a hierarchical protocol stack, including various protocol layers at which various functions are performed. For example, many cellular communication systems may include at least radio link control, media access control, and physical layers. Additionally, one or more (e.g., higher) networking layers (e.g., TCP/IP, among various possibilities) may also be used in conjunction with a cellular protocol stack, in many instances.

To support their respective functions, it may be common for a wireless device to maintain independent data buffers at RLC and MAC layers. Thus, there may be some instances when a RLC PDU is already decoded at the MAC layer, but the RLC PDU is not transferred to RLC until the full transport block CRC is passed for the transport block in which the RLC PDU was received. In other words, there may be some delay between receiving packets at MAC and providing them to RLC. Such delays may even be compounded and/or result in reduced overall throughput, in some instances, for example if a TCP acknowledgement times out while waiting in a MAC buffer and thereby contributes to TCP throttling being enabled.

Figure 6:
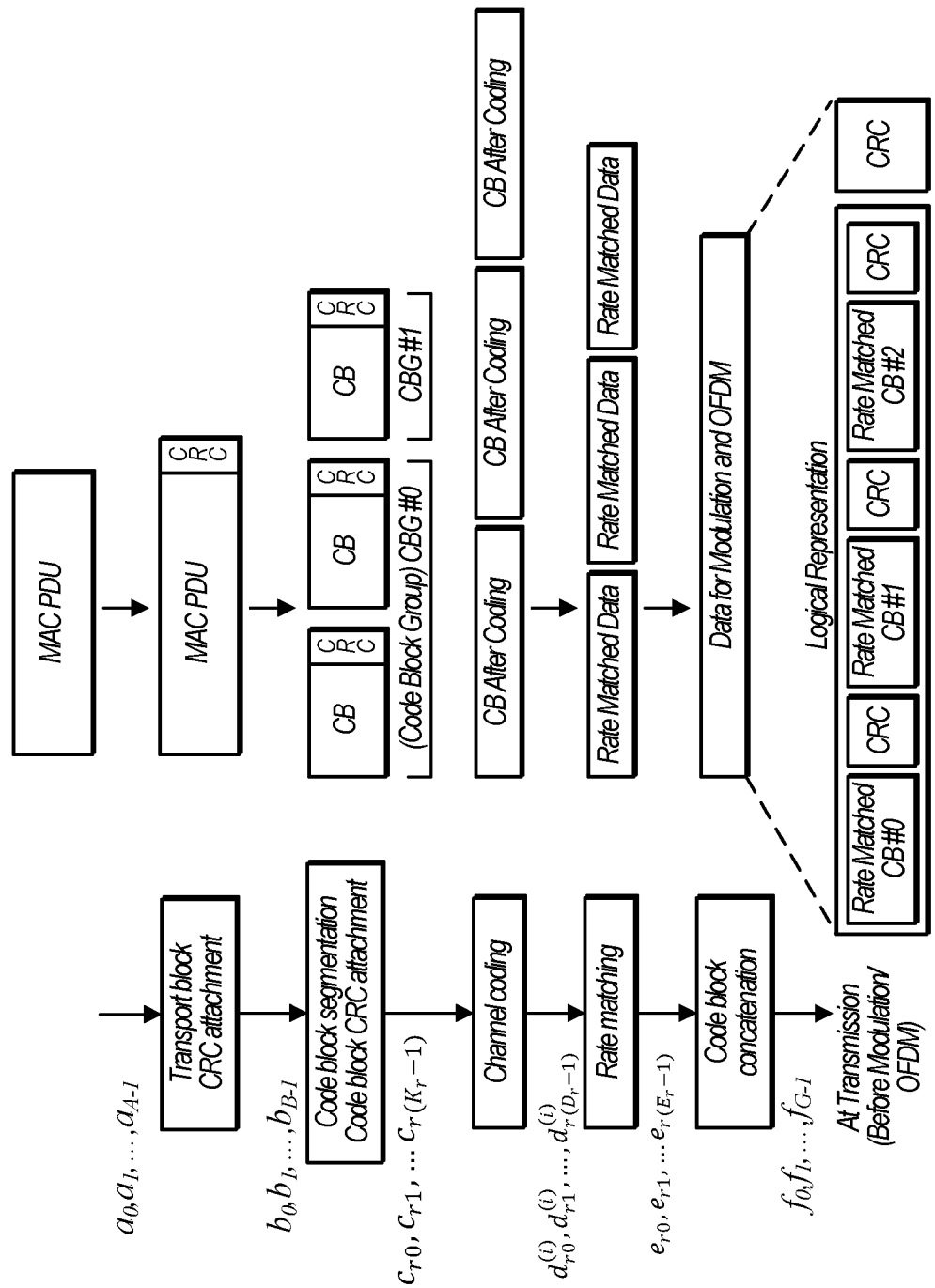
FIG. 6 illustrates aspects of an exemplary possible process for preparing data for wireless communication, according to some embodiments.

In some communication systems, it may be possible to reduce such delays, while still maintaining a substantial degree of reliability and robustness based on CRC use. For example, it may be possible for multiple code blocks (e.g., possibly grouped into code block groups) to be included in a hybrid automatic repeat request (HARQ) transport block, with each code block being CRC protected, in addition to overall transport block CRC protection. Thus it may be possible to provide HARQ ACK/NACK feedback on a per code block group basis, e.g., in addition (or as an alternative) to providing HARQ ACK/NACK feedback with respect to the overall transport block. FIG. 6 illustrates examples of possible MAC and PHY layer operations to prepare a MAC PDU for wireless transmission according to such a framework, at least according to some embodiments. For example, the approach illustrated in FIG. 6 may be used in conjunction with 5G NR cellular communication, according to some embodiments.

As shown in the illustrated example, a CRC may be attached to a MAC PDU transport block. The transport block may be segmented into code blocks, with a CRC attached to each code block. Certain of the code blocks may be grouped into code block groups. Channel coding, rate matching, and code block concatenation may be performed to prepare the data for modulation and orthogonal frequency division multiplexing transmission.

With multiple such levels of CRC protection, it may be possible for the HARQ process to deliver a partial transport block to MAC/RLC once the first code block group CRC is passed, potentially even if the overall transport block CRC is failed. Note that it may also be possible for HARQ to deliver partial a transport block to MAC/RLC as it is decoding more code block groups, e.g., through soft combining of re-transmissions.

The MAC layer may tag such partial transport blocks as having failed the transport block CRC, e.g., with a "TbCrc failed" tag. At least according to some embodiments, it may be preferable to handover a partial transport block only if the wireless device is able to parse at least one MAC header (R/LCID/L) and to determine that at least one complete MAC subPDU (e.g., a MAC SDU/RLC PDU) is decoded.

The HARQ process may still send the full transport block to MAC/RLC once a full packet CRC is passed. This may result in duplicate packets being provided to RLC on some occasions, which the RLC may be able to handle, e.g., by discarding the duplicate packets.

A transport block may also include one or more MAC CEs. There may be multiple options for handling these in case of a transport block CRC failure. As one option, it may be the case that MAC does not act on MAC CEs in a transport block if the transport block CRC fails. Thus, the wireless device may wait until a transport block retransmission with a successful transport block CRC including those MAC CEs is received to act on those MAC CEs. As another option, it may be the case that MAC parses and acts on (e.g., both variable and fixed to length) MAC CEs as long as it can decode the complete MAC CE (e.g., R, LCID, optional L and CE contents), even if the transport block CRC fails. Note that it may be the case that this is only possible in the downlink direction, e.g., if MAC CEs are included at the end of the transport block in the uplink direction. Additionally, in such a case, when MAC receives a partial or full transport block, and MAC has already received a copy of another partial TB for the same HARQ process (e.g., with TbCrc failed), MAC may ignore CE that it already acted on when it received the previous copy of the transport block.

Note that as such a mechanism for early packet delivery to RLC may in some instances bypass the transport block level CRC, it may have correspondingly slightly reduced reliability, e.g., relative to a framework in which both code block and transport block level CRCs must be passed before providing packet data to RLC. Accordingly, it may be desirable to provide a control mechanism as to whether such a feature is enabled. For example, a cell may provide radio resource control (RRC) signaling to enable or disable such a feature for wireless devices served by the cell. The cell may determine whether to enable or disable such a feature with each individual wireless device (and possibly for each radio bearer for each wireless device) based on the reliability requirements for traffic communicated with each wireless device, and/or based on any of various other considerations, as desired. As another possibility, a cell may provide broadcast system information (e.g., in system information blocks, that may be acquired by wireless devices during cell acquisition) indicating whether such a feature is supported and/or enabled on a cell-wide basis.

It should be noted that it may be possible (e.g., on rare occasions) for a code block to be corrupted while still passing a CRC. In some embodiments, a wireless device may be configured for RLC to handle RLC PDUs provided that are associated with transport blocks that failed transport block level CRCs without any specific handling to account for such a possible scenario. Thus, the RLC and higher layers may process and use such packets when they occur. As another option, at least in some instances, it may be possible to replace a TbCrc failed packet that is still in the RLC buffer with a subsequently received TbCrC passed duplicate packet. Such handling may differ from typical RLC duplicate packet handling, e.g., in which the newer packet may be discarded, and may reduce the likelihood that a corrupted packet is used, e.g., since it may be less likely that a packet that passes both code block CRC and transport block CRC is corrupted than that a packet that passes only code block CRC is corrupted, at least in some instances. Note that even if such abnormal condition handling is implemented, if a packet that passes only code block CRC has already been processed and provided to a higher layer when a duplicate packet that passes both code block CRC and transport block CRC is received, the duplicate packet that passes both code block CRC and transport block CRC may be discarded.

Figure 7:
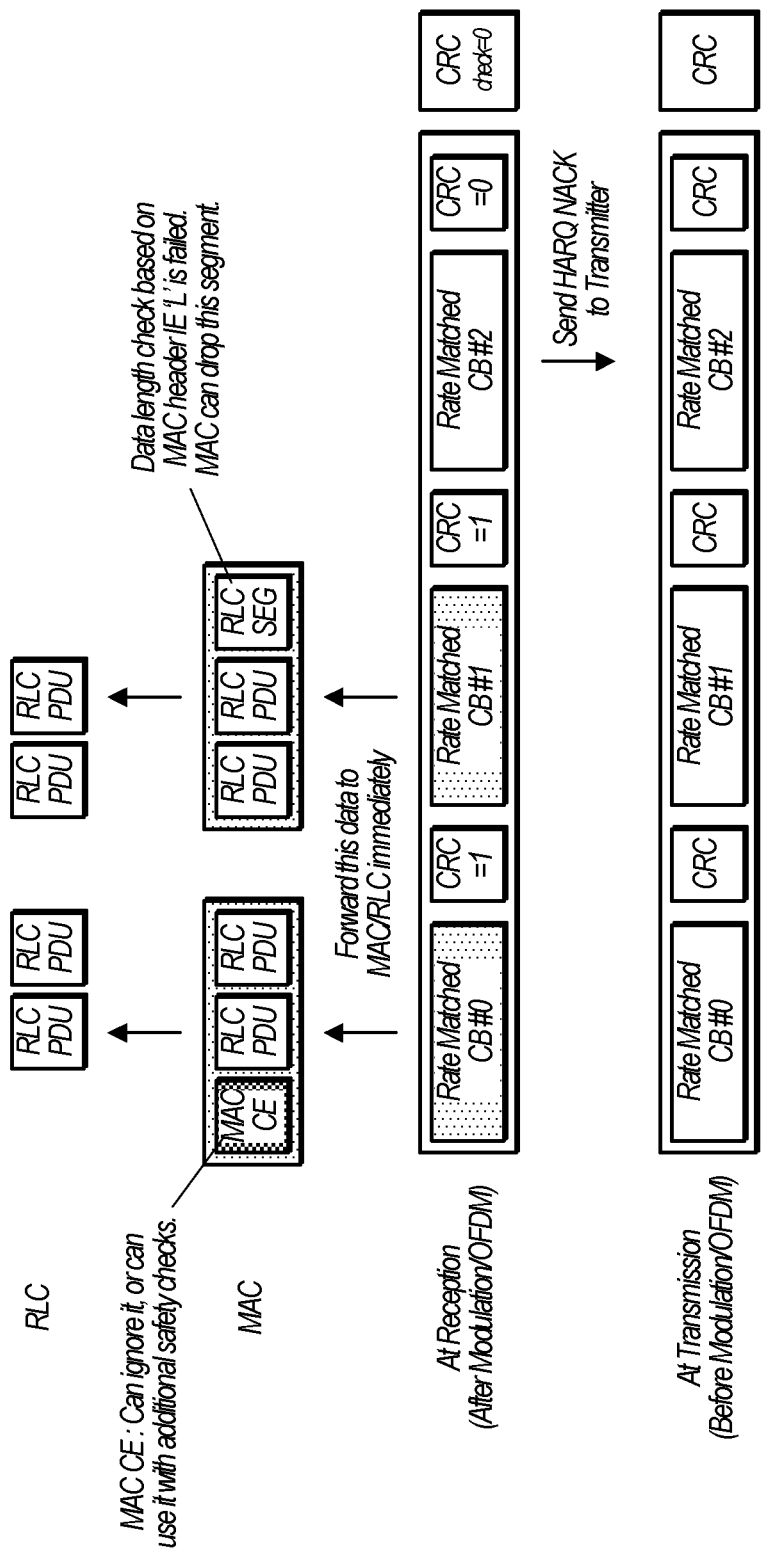
FIG. 7 illustrates aspects of an exemplary possible approach to providing early packet delivery to radio link control, according to some embodiments.

FIG. 7 illustrates aspects of such an approach to providing early packet delivery to radio link control as described herein in accordance with an example scenario. As shown, a transport block including three rate matched code blocks, each with a code block CRC, as well as a transport block CRC, may be transmitted. At reception, the first two code blocks may pass CRCs, while the third code block and the overall transport block may fail CRCs. The first two code blocks may be passed to MAC, which may parse the MAC headers to determine that the first code block includes a MAC CE and two complete RLC PDUs, while the second code block includes two complete RLC PDUs and a partial RLC PDU (e.g., a segment of a RLC PDU). The complete RLC PDUs may be provided to RLC, while the partial RLC PDU may be dropped. The MAC CE may be ignored, or may be used with additional safety checks, such as described previously herein. The HARQ process may send a HARQ ACK to the transmitter with respect to each of the first two code blocks, and a HARQ NACK to the transmitter with respect to the third code block and the overall transport block.

FIGS. 8-12 illustrate further aspects of various possible example scenarios in which techniques for providing early packet delivery to radio link control are used, according to some embodiments.

Figure 8:
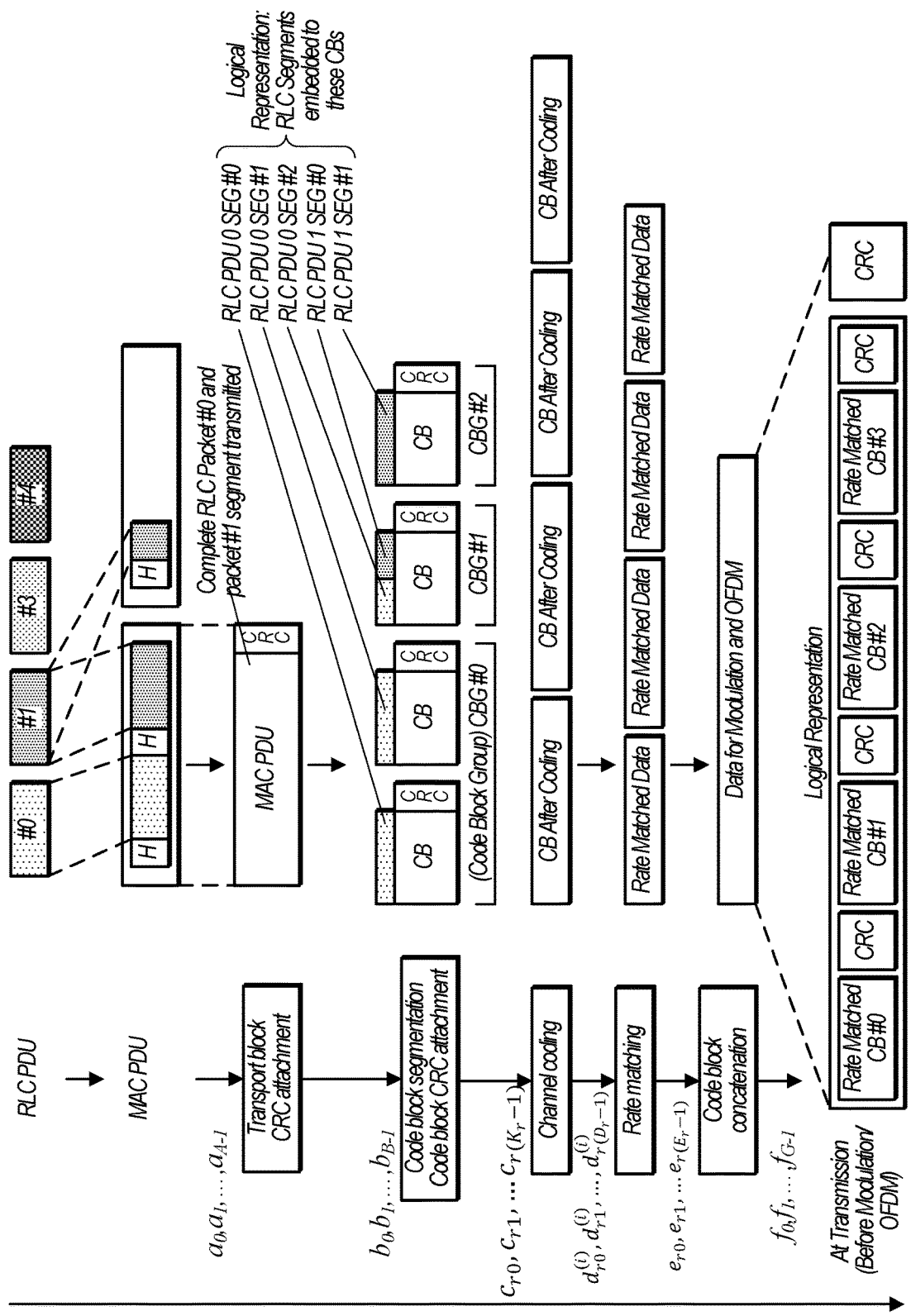
FIG. 8-12 illustrate aspects of various possible example scenarios in which techniques for providing early packet delivery to radio link control are used, according to some embodiments.

FIG. 8 illustrates aspects of data processing for transmission at a transmission entity according to an example scenario. As shown, the RLC layer may provide RLC PDUs to the MAC layer, which may process the RLC PDUs into MAC PDUs. In the illustrated example scenario, a MAC PDU may be generated that includes one complete RLC PDU (RLC PDU #0) and a segment of a second RLC PDU (RLC PDU #1). The MAC PDU may have transport block CRC attachment performed, followed by code block segmentation and code block CRC attachment. In the illustrated example, four code blocks may be used, which may be logically grouped into three code block groups (e.g., code block group #0 including the first two code blocks, code block group #1 including the third code block, and code block group #2 including the fourth code block). Further, channel coding, rate matching, and code block concatenation may be performed to generate data for modulation and OFDM transmission.

Figure 9:
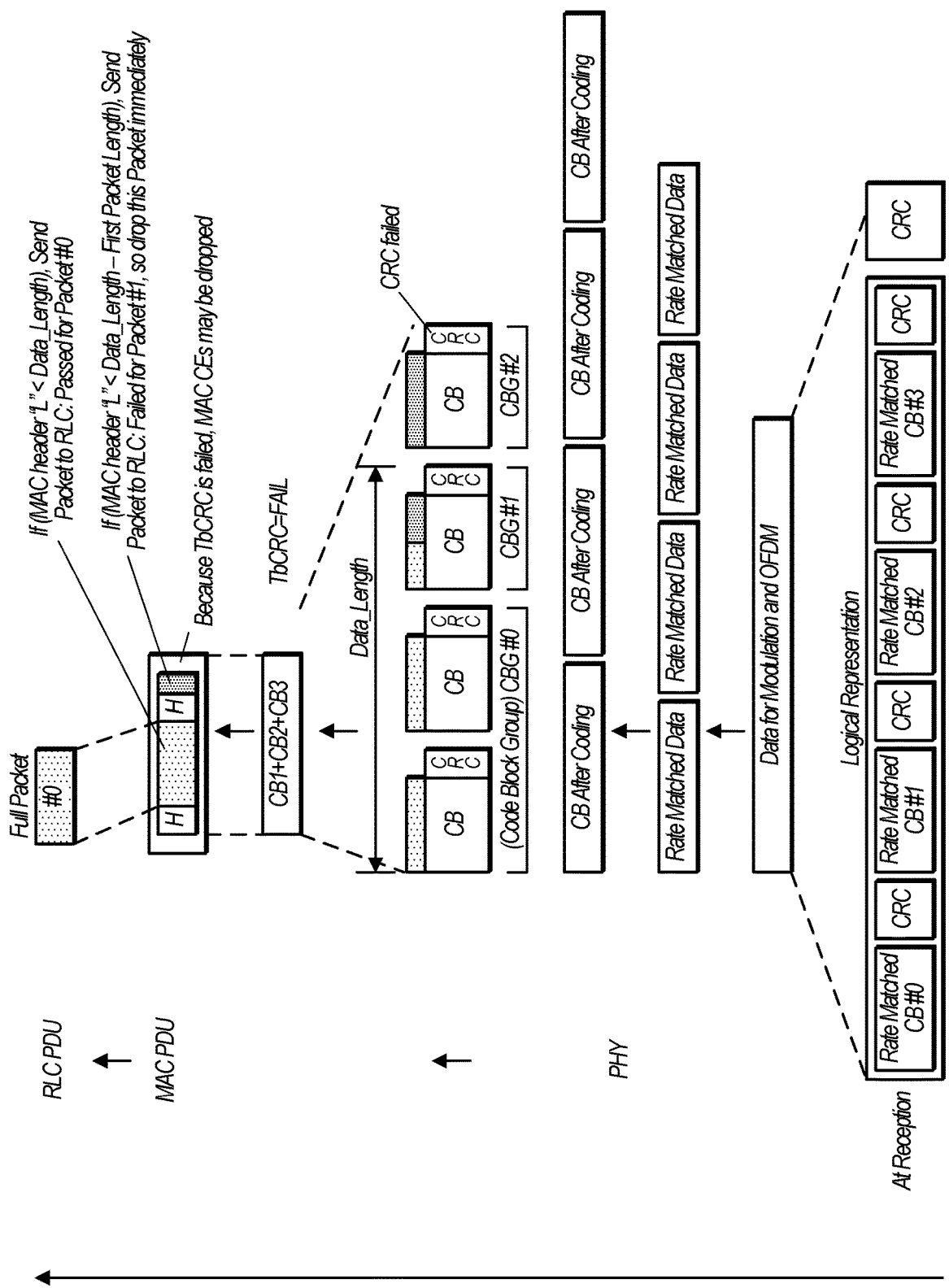

FIG. 9 follows the example scenario of FIG. 8, illustrating possible receiver data processing in a scenario in which the last code block CRC failed. As shown, the receiver may obtain the code blocks from the rate matched channel coded data, and may determine that the first three code blocks pass CRC but that the fourth code block fails CRC. In this case, the first three code blocks may be passed to MAC, which may determine that one complete RLC PDU (i.e., RLC PDU #0) is included in the code blocks that passed CRC, and so may provide that RLC PDU to the RLC layer.

Figure 10:
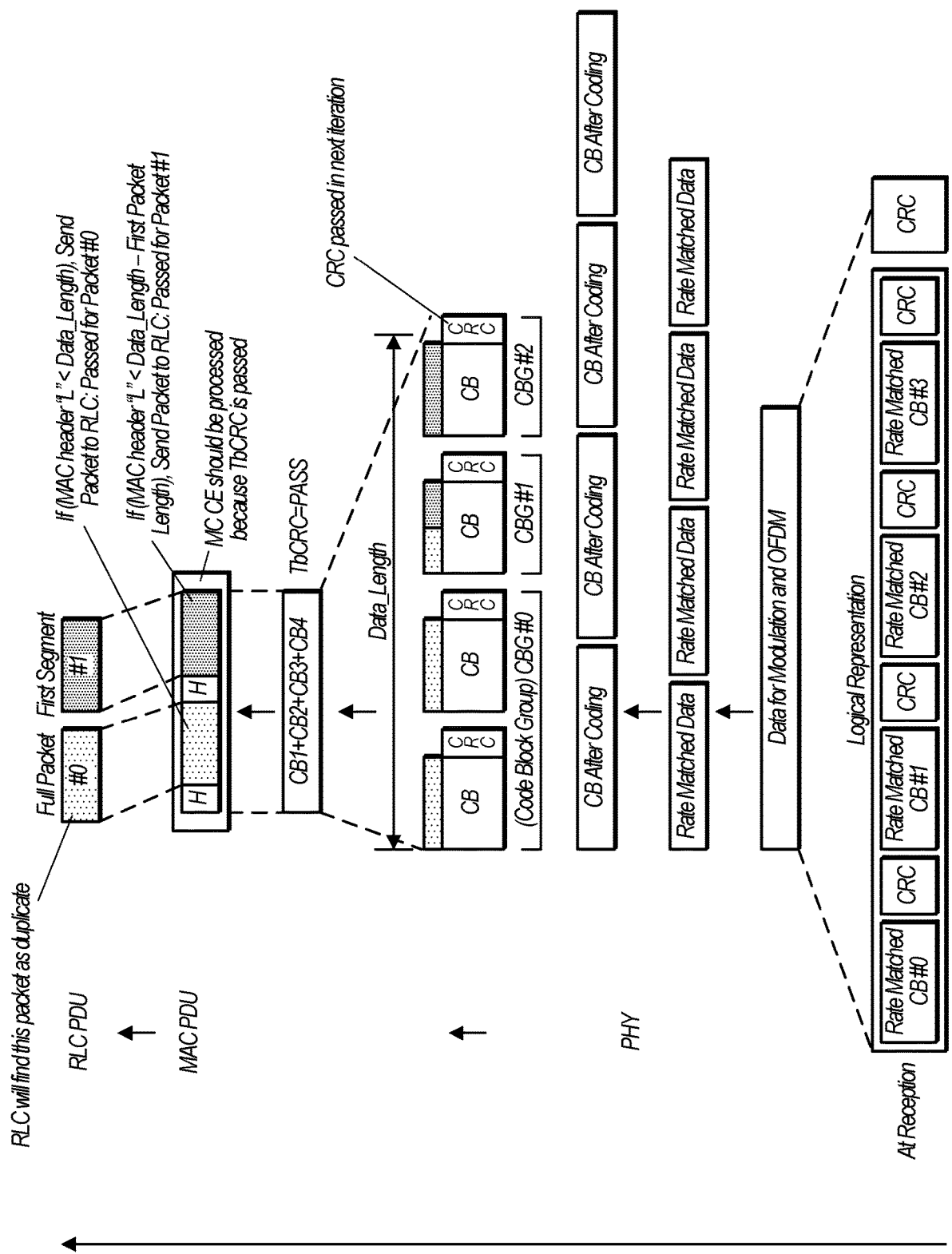

FIG. 10 further follows the example scenario of FIG. 9, illustrating possible receiver data processing in a scenario in which all code blocks passed CRCs upon receiving a retransmission of the transport block. As shown, the receiver may obtain the code blocks from the rate matched channel coded data, and may determine that all of the code blocks pass CRC. In this case, all four code blocks may be passed to MAC, which may in turn provide the complete RLC PDU (i.e., RLC PDU #0) and the RLC PDU segment (i.e., from RLC PDU #1) included in the MAC PDU to the RLC layer. The RLC layer may find the RLC PDU #0 to be a duplicate packet, e.g., since it was previously provided to the RLC layer, and may handle the duplicate packet accordingly (e.g., discarding the duplicate packet, or possibly discarding the previously received packet and replacing it with the newly received packet, as previously described herein, according to various embodiments).

Figure 11:
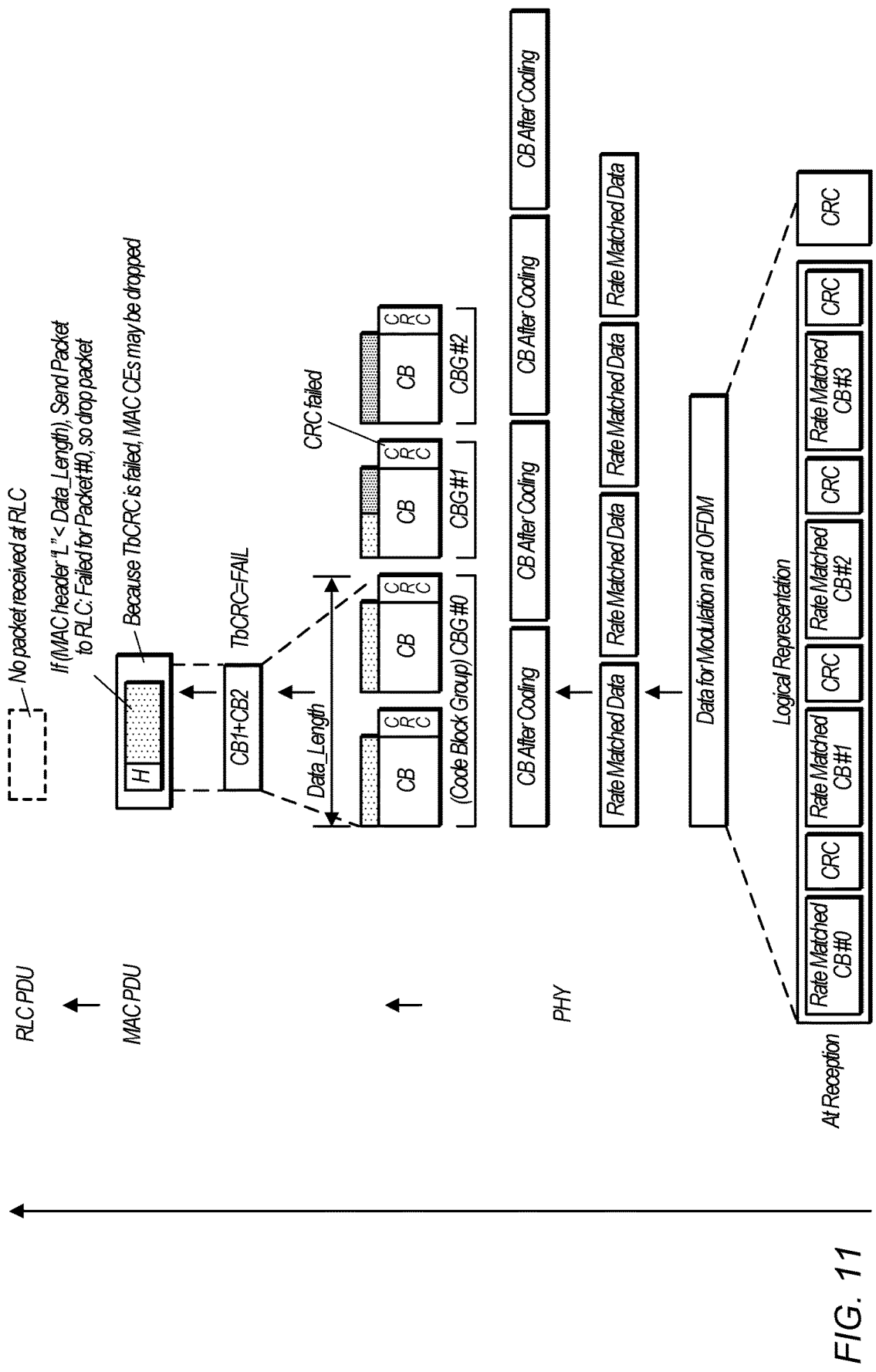

FIG. 11 illustrates an alternate scenario following from the example scenario of FIG. 8, illustrating possible receiver data processing in a scenario in which the third code block CRC failed. As shown, the receiver may obtain the code blocks from the rate matched channel coded data, and may determine that the first two code blocks (as well as the fourth code block) pass CRC but that the third code block fails CRC. In this case, the first two code blocks may be passed to MAC, which may determine that no complete RLC PDUs are included in the code blocks that passed CRC. Thus, in such a scenario, it may be the case that no packet data is provided to the RLC layer from the transport block.

Figure 12:
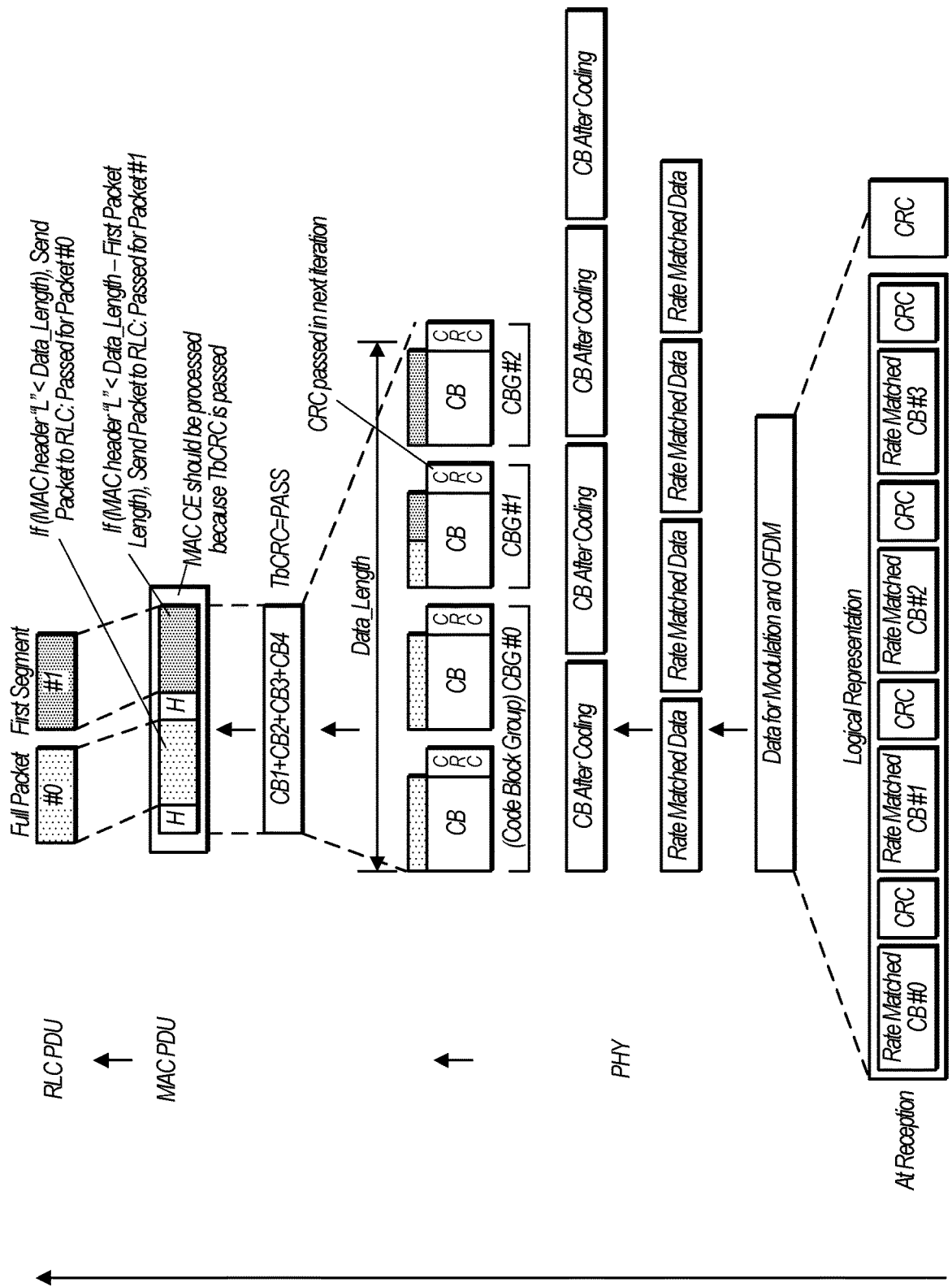

FIG. 12 further follows the example scenario of FIG. 11, illustrating possible receiver data processing in a scenario in which all code blocks passed CRCs upon receiving a retransmission of the transport block. As shown, the receiver may obtain the code blocks from the rate matched channel coded data, and may determine that all of the code blocks pass CRC. In this case, all four code blocks may be passed to MAC, which may in turn provide the complete RLC PDU (i.e., RLC PDU #0) and the RLC PDU segment (i.e., from RLC PDU #1) included in the MAC PDU to the RLC layer.

In the following further exemplary embodiments are provided.

One set of embodiments may include an apparatus, comprising a processing element configured to cause a wireless device to: receive a first transport block via wireless communication, wherein the first transport block comprises a plurality of code blocks; determine that a first code block of the first transport block passed a cyclic redundancy check for the first code block; determine that the first transport block failed a cyclic redundancy check for the first transport block; and provide packet data from the first code block of the first transport block to a radio link control layer of the wireless device based at least in part on the first code block of the first transport block passing the cyclic redundancy check for the first code block.

According to some embodiments, the processing element is further configured to cause the wireless device to: provide an indication that the packet data from the first code block is associated with a transport block that failed a cyclic redundancy check to the radio link control layer.

According to some embodiments, the packet data from the first code block comprises at least a portion of a first radio link control protocol data unit.

According to some embodiments, the processing element is further configured to cause the wireless device to: determine that a second code block of the first transport block passed a cyclic redundancy check for the second code block; and provide packet data from the second code block of the first transport block to a radio link control layer of the wireless device based at least in part on the second code block of the first transport block passing the cyclic redundancy check for the second code block.

According to some embodiments, wherein the packet data from the second code block comprises at least a portion of the first radio link control protocol data unit.

According to some embodiments, the packet data from the second code block comprises at least a portion of a second radio link control protocol data unit.

According to some embodiments, the processing element is further configured to cause the wireless device to: receive control signaling from a cellular base station indicating that the wireless device is allowed to provide packet data from code blocks that pass cyclic redundancy checks to its radio link control layer even if a transport block cyclic redundancy check fails.

According to some embodiments, the processing element is further configured to cause the wireless device to: receive a second transport block via wireless communication, wherein the second transport block is received subsequent to the first transport block; determine that the second transport block passed a cyclic redundancy check for the second transport block: provide packet data from the second transport block to the radio link control layer of the wireless device, wherein the packet data from the second transport block comprises duplicate packet data with respect to the packet data from the first code block of the first transport block; and discard the packet data from the first code block of the first transport block at the radio link control layer based at least in part on the second transport block having passed the cyclic redundancy check for the second transport block.

Another set of embodiments may include a wireless device, comprising: at least an antenna; a radio operably coupled to the antenna; and a processing element operably coupled to the radio; wherein the wireless device is configured to: receive a transport block via wireless communication, wherein the transport block comprises a plurality of code blocks; determine that a subset of the plurality of code blocks passed code block cyclic redundancy checks; determine that the transport block failed a transport block cyclic redundancy check; and provide packet data from the subset of the plurality of code blocks that passed code block cyclic redundancy checks to a radio link control layer of the wireless device based at least in part the code block cyclic redundancy checks.

According to some embodiments, the wireless device is further configured to: parse a first media access control header of the transport block to determine a length of a first radio link control protocol data unit comprised in the transport block; and determine whether the first radio link control protocol data unit is comprised entirely in the subset of the plurality of code blocks that passed code block cyclic redundancy checks based at least in part on the determined length of the first radio link control protocol data unit, wherein the packet data from the subset of the plurality of code blocks that passed code block cyclic redundancy checks is provided to the radio link control layer of the wireless device further based at least in part on determining whether the first radio link control protocol data unit is comprised entirely in the subset of the plurality of code blocks that passed code block cyclic redundancy checks, wherein radio link control protocol data units that are not comprised entirely in the subset of the plurality of code blocks that passed code block cyclic redundancy checks are not provided to the radio link control layer of the wireless device.

According to some embodiments, the wireless device is further configured to: provide an indication that the packet data from the subset of the plurality of code blocks that passed code block cyclic redundancy checks is associated with a transport block that failed a cyclic redundancy check to the radio link control layer.

According to some embodiments, the wireless device is further configured to: receive control signaling from a cellular base station indicating whether providing packet data from code blocks that pass cyclic redundancy checks to radio link control even if a transport block cyclic redundancy check fails is allowed, wherein the packet data from the subset of the plurality of code blocks that passed code block cyclic redundancy checks is provided to the radio link control layer of the wireless device further based at least in part on the control signaling.

According to some embodiments, the wireless device is further configured to: determine that the subset of the plurality of code blocks that passed code block cyclic redundancy checks comprise one or more media access control layer control elements; determine not to act on the one or more media access control layer control elements based at least in part on the transport block having failed the transport block cyclic redundancy check.

According to some embodiments, the wireless device is further configured to: determine that the subset of the plurality of code blocks that passed code block cyclic redundancy checks comprise one or more media access control layer control elements: determine to act on the one or more media access control layer control elements based at least in part on the one or more media access control layer control elements being comprised in the subset of the plurality of code blocks that passed code block cyclic redundancy checks.

According to some embodiments, the wireless device is further configured to: receive a transport block that comprises a retransmission of the one or more media access control layer control elements; and determine to not act on the retransmission of the one or more media access control layer control elements based at least in part on having previously acted on the one or more media access control layer control elements.

Yet another set of embodiments may include a method, comprising: by a wireless device: receiving a transport block via wireless communication, wherein the transport block comprises a plurality of code blocks; determining that a subset of the plurality of code blocks passed code block cyclic redundancy checks; determining that the transport block failed a transport block cyclic redundancy check; determining that the subset of the plurality of code blocks that passed code block cyclic redundancy checks comprise at least one complete radio link control protocol data unit; and providing the at least one complete radio link control protocol data unit to a radio link control layer of the wireless device.

According to some embodiments, if the subset of the plurality of code blocks that passed code block cyclic redundancy checks comprise a partial radio link control protocol data unit, packet data associated with the partial radio link control protocol data unit is not provided to the radio link control layer of the wireless device.

According to some embodiments, the method further comprises: parsing one or more media access control headers of the transport block; determining a length of at least a first radio link control protocol data unit based at least in part on parsing one or more media access control headers of the transport block; wherein determining that the subset of the plurality of code blocks that passed code block cyclic redundancy checks comprise at least one complete radio link control protocol data unit is based at least in part on determining the length of at least the first radio link control protocol data unit.

According to some embodiments, the method further comprises: providing an indication that at least one complete radio link control protocol data unit is associated with a transport block that failed a transport block cyclic redundancy check to the radio link control layer. According to some embodiments, the method further comprises: receiving an indication that providing packet data from code blocks that pass code block cyclic redundancy checks within a transport block that fails a transport block cyclic redundancy check to radio link control is allowed, wherein the at least one complete radio link control protocol data unit is provided to the radio link control layer of the wireless device further based at least in part on the indication.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

Yet another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:
1. An apparatus, comprising:
a processing element configured to cause a wireless device to:
receive control signaling from a cellular base station indicating that the wireless device is allowed to provide packet data from code blocks that pass cyclic redundancy checks to a radio link control layer of the wireless device even if a transport block cyclic redundancy check fails;
receive a first transport block via wireless communication, wherein the first transport block comprises a plurality of code blocks;
determine that a first code block of the first transport block passed a cyclic redundancy check for the first code block;
determine that the first transport block failed a cyclic redundancy check for the first transport block; and
provide packet data from the first code block of the first transport block to the radio link control layer of the wireless device based at least in part on the first code block of the first transport block passing the cyclic redundancy check for the first code block.

2. The apparatus of claim 1, wherein the processing element is further configured to cause the wireless device to:
provide an indication that the packet data from the first code block is associated with a transport block that failed a cyclic redundancy check to the radio link control layer.

3. The apparatus of claim 1,
wherein the packet data from the first code block comprises at least a portion of a first radio link control protocol data unit.

4. The apparatus of claim 3, wherein the processing element is further configured to cause the wireless device to:
determine that a second code block of the first transport block passed a cyclic redundancy check for the second code block; and
provide packet data from the second code block of the first transport block to a radio link control layer of the wireless device based at least in part on the second code block of the first transport block passing the cyclic redundancy check for the second code block.

5. The apparatus of claim 4,
wherein the packet data from the second code block comprises at least a portion of the first radio link control protocol data unit.

6. The apparatus of claim 4,
wherein the packet data from the second code block comprises at least a portion of a second radio link control protocol data unit.

7. The apparatus of claim 1, wherein the processing element is further configured to cause the wireless device to:
receive a second transport block via wireless communication, wherein the second transport block is received subsequent to the first transport block;
determine that the second transport block passed a cyclic redundancy check for the second transport block;
provide packet data from the second transport block to the radio link control layer of the wireless device, wherein the packet data from the second transport block comprises duplicate packet data with respect to the packet data from the first code block of the first transport block; and
discard the packet data from the first code block of the first transport block at the radio link control layer based at least in part on the second transport block having passed the cyclic redundancy check for the second transport block.

8. The apparatus of claim 1, wherein the processing element is further configured to:
determine that a subset of the plurality of code blocks that passed code block cyclic redundancy checks, including the first code block, comprise at least one complete radio link control protocol data unit, wherein said determining that the subset of the plurality of code blocks that passed code block cyclic redundancy checks comprise at least one complete radio link control protocol data unit comprises parsing one or more media access control headers of the transport block and determining a length of at least a first radio link control protocol data unit based at least in part on parsing one or more media access control headers of the transport block, wherein determining that the subset of the plurality of code blocks that passed code block cyclic redundancy checks comprise at least one complete radio link control protocol data unit is based at least in part on determining the length of at least the first radio link control protocol data unit;
wherein said providing the packet data from the first code block of the first transport block to the radio link control layer of the wireless device comprises providing the at least one complete radio link control protocol data unit to the radio link control layer of the wireless device.

9. The apparatus of claim 1, wherein the processing element is further configured to:
determine that a subset of the plurality of code blocks that passed code block cyclic redundancy checks, including the first code block, comprise one or more media access control layer control elements;
determine to act on the one or more media access control layer control elements based at least in part on the one or more media access control layer control elements being comprised in the subset of the plurality of code blocks that passed code block cyclic redundancy checks;
receive a transport block that comprises a retransmission of the one or more media access control layer control elements; and
determine to not act on the retransmission of the one or more media access control layer control elements based at least in part on having previously acted on the one or more media access control layer control elements.

10. A wireless device, comprising:
at least an antenna;
a radio operably coupled to the antenna; and
a processing element operably coupled to the radio;
wherein the wireless device is configured to:
receive a transport block via wireless communication, wherein the transport block comprises a plurality of code blocks;
determine that a subset of the plurality of code blocks passed code block cyclic redundancy checks;
determine that the subset of the plurality of code blocks that passed code block cyclic redundancy checks comprise one or more media access control layer control elements;
determine to act on the one or more media access control layer control elements based at least in part on the one or more media access control layer control elements being comprised in the subset of the plurality of code blocks that passed code block cyclic redundancy checks:
determine that the transport block failed a transport block cyclic redundancy check;
provide packet data from the subset of the plurality of code blocks that passed code block cyclic redundancy checks to a radio link control layer of the wireless device based at least in part the code block cyclic redundancy checks;
receive a transport block that comprises a retransmission of the one or more media access control layer control elements; and
determine to not act on the retransmission of the one or more media access control layer control elements based at least in part on having previously acted on the one or more media access control layer control elements.

11. The wireless device of claim 10, wherein the wireless device is further configured to:
parse a first media access control header of the transport block to determine a length of a first radio link control protocol data unit comprised in the transport block; and
determine whether the first radio link control protocol data unit is comprised entirely in the subset of the plurality of code blocks that passed code block cyclic redundancy checks based at least in part on the determined length of the first radio link control protocol data unit,
wherein the packet data from the subset of the plurality of code blocks that passed code block cyclic redundancy checks is provided to the radio link control layer of the wireless device further based at least in part on determining whether the first radio link control protocol data unit is comprised entirely in the subset of the plurality of code blocks that passed code block cyclic redundancy checks,
wherein radio link control protocol data units that are not comprised entirely in the subset of the plurality of code blocks that passed code block cyclic redundancy checks are not provided to the radio link control layer of the wireless device.

12. The wireless device of claim 10, wherein the wireless device is further configured to:
provide an indication that the packet data from the subset of the plurality of code blocks that passed code block cyclic redundancy checks is associated with a transport block that failed a cyclic redundancy check to the radio link control layer.

13. The wireless device of claim 10, wherein the wireless device is further configured to:
receive control signaling from a cellular base station indicating whether providing packet data from code blocks that pass cyclic redundancy checks to radio link control even if a transport block cyclic redundancy check fails is allowed,
wherein the packet data from the subset of the plurality of code blocks that passed code block cyclic redundancy checks is provided to the radio link control layer of the wireless device further based at least in part on the control signaling.

14. The wireless device of claim 10, wherein the wireless device is further configured to:
determine that the subset of the plurality of code blocks that passed code block cyclic redundancy checks comprise one or more media access control layer control elements;
determine not to act on the one or more media access control layer control elements based at least in part on the transport block having failed the transport block cyclic redundancy check.

15. The wireless device of claim 10, wherein if the subset of the plurality of code blocks that passed code block cyclic redundancy checks comprise a partial radio link control protocol data unit, packet data associated with the partial radio link control protocol data unit is not provided to the radio link control layer of the wireless device.

16. A method, comprising:
by a wireless device:
receiving a transport block via wireless communication, wherein the transport block comprises a plurality of code blocks;
determining that a subset of the plurality of code blocks passed code block cyclic redundancy checks;
determining that the transport block failed a transport block cyclic redundancy check;
determining that the subset of the plurality of code blocks that passed code block cyclic redundancy checks comprise at least one complete radio link control protocol data unit, wherein said determining that the subset of the plurality of code blocks that passed code block cyclic redundancy checks comprise at least one complete radio link control protocol data unit comprises parsing one or more media access control headers of the transport block and determining a length of at least a first radio link control protocol data unit based at least in part on parsing one or more media access control headers of the transport block, wherein determining that the subset of the plurality of code blocks that passed code block cyclic redundancy checks comprise at least one complete radio link control protocol data unit is based at least in part on determining the length of at least the first radio link control protocol data unit; and
providing the at least one complete radio link control protocol data unit to a radio link control layer of the wireless device.

17. The method of claim 16,
wherein if the subset of the plurality of code blocks that passed code block cyclic redundancy checks comprise a partial radio link control protocol data unit, packet data associated with the partial radio link control protocol data unit is not provided to the radio link control layer of the wireless device.

18. The method of claim 16, further comprising:
providing an indication that at least one complete radio link control protocol data unit is associated with a transport block that failed a transport block cyclic redundancy check to the radio link control layer.

19. The method of claim 16, further comprising
receiving an indication that providing packet data from code blocks that pass code block cyclic redundancy checks within a transport block that fails a transport block cyclic redundancy check to radio link control is allowed,
wherein the at least one complete radio link control protocol data unit is provided to the radio link control layer of the wireless device further based at least in part on the indication.

20. The method of claim 16, further comprising:
receiving control signaling from a cellular base station indicating that the wireless device is allowed to provide packet data from code blocks that pass cyclic redundancy checks to a radio link control layer of the wireless device even if a transport block cyclic redundancy check fails.

\* \* \* \* \*